UNITED STATES PATENT OFFICE.

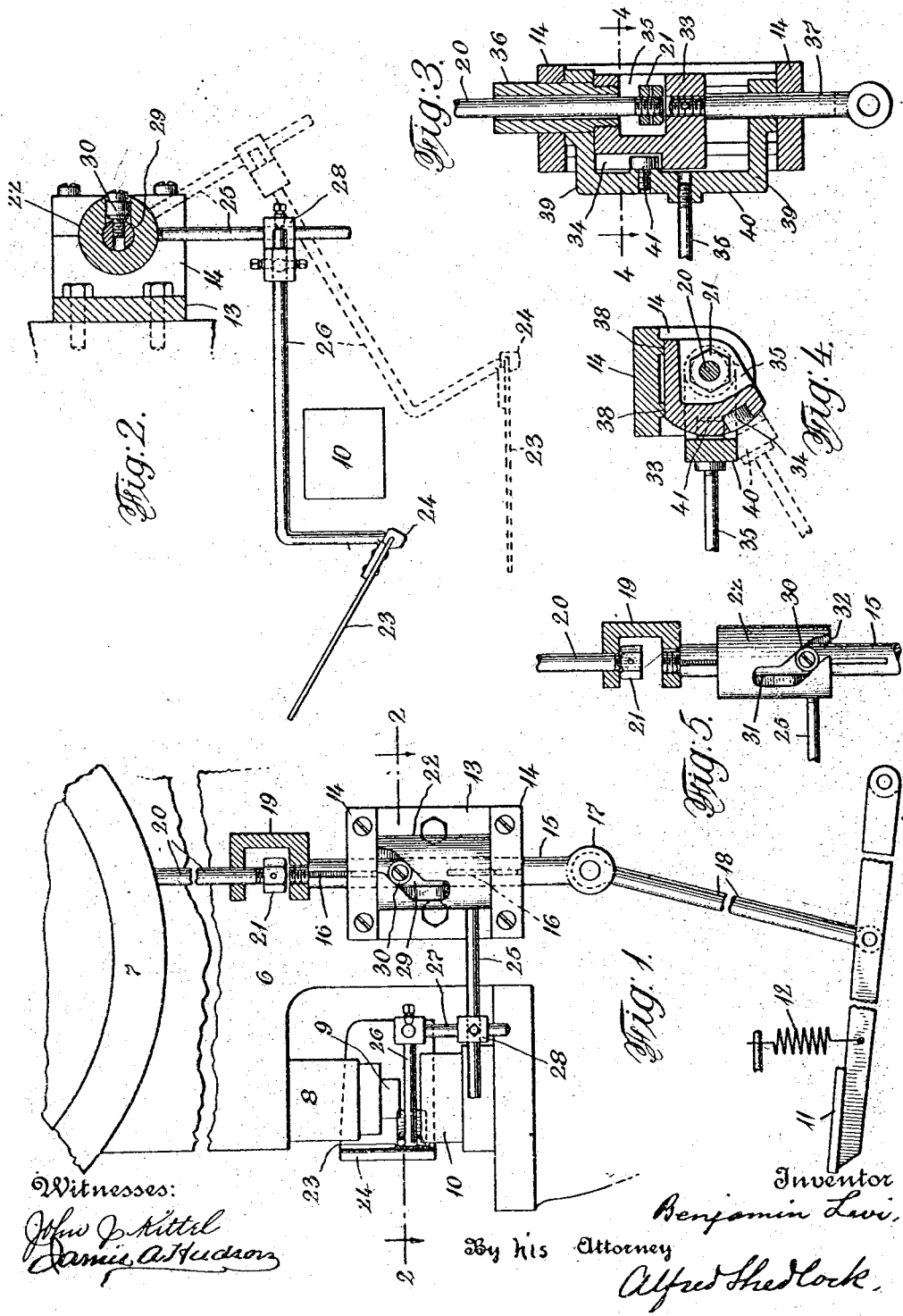

BENJAMIN LEVI, OF NEW YORK, N. Y.

SAFETY DEVICE FOR PRESSES.

1,155,746.  Specification of Letters Patent.  Patented Oct. 5, 1915.

Application filed March 16, 1915. Serial No. 14,840.

*To all whom it may concern:*

Be it known that I, BENJAMIN LEVI, a citizen of the United States, and a resident of New York, county and State of New York, have invented new and useful Improvements in Safety Devices for Presses, of which the following is a specification.

The safety device forming the subject of this invention is designed to include all of the essential features of a practical operative safety mechanism, the requirements of which are, simplicity of construction, a minimum number of parts, positive action, non-interferce with the ordinary press mechanism, adaptability of application to all kinds of presses and non-liability to derangement. Such a mechanism is illustrated in the accompanying drawings, in which:

Figure 1, is an elevation of the safety device shown applied to the side of a press. Fig. 2, a sectional plan view on the line 2, 2, Fig. 1. Fig. 3, illustrates a modification in the construction and arrangements of parts. Fig. 4, a sectional plan view of the same taken on the line 4, 4, Fig. 3, and; Fig. 5, is another modification.

All of the parts of the safety device are carried on a bracket frame adapted to be secured to the side of a press, and they consist of a rotatable member having an arm extending therefrom arranged to pass between moving and stationary tools of the press and provided with a guard plate which is moved laterally in front of the tools when the rotatable member is rocked, a sliding non-rotatable member having bearings in the bracket frame, a working connection between the sliding member and the rotatable member, a loose connection between the sliding member and the clutch trip rod and a connection between the sliding member and the treadle or other operating means of the press.

The construction and arrangement of the parts are such, that, upon power being applied to the treadle initial movement of the sliding member will rock the rotatable member and positively set the guard plate in front of the press tools and then by its continuing movement act on the clutch trip rod, the guard being held in safety position while the press is in action.

6 designates the press body or frame, 7 the driving wheel or pulley. 8 the plunger carrying a tool 9, 10 a stationary tool on the bed of the press, 11 the operating treadle and 12 a spring for raising the treadle and setting the parts of the safety device in normal inactive position.

The bracket frame consists of a back plate 13, by which it is secured to the side of the press, and flanges 14, 14, at its upper and lower edges. The sliding member, as shown in Figs. 1, 2 and 5 is of the nature of a round bar 15 fitted to vertically slide in holes formed in the flanges of the bracket frame; it is prevented from rotating by splines or feathers set in the holes of the flanges 14, 14, and working in the grooves 16; the lower end of the bar 15 is provided with an eye 17 by which, through the medium of the connecting rod 18, it is connected to the treadle 11. Spring 12 raises the treadle after it has been depressed by the operator. A yoke 19 is by one of its sides secured to the upper end of the sliding bar 15, the other side of the yoke being perforated to freely embrace the lower end of the clutch trip rod 20, which is provided with a head or nut 21, located within the yoke with a space between the head 21 and the upper side of the yoke when the parts are in normal inactive position, as shown in Fig. 1.

The rotatable member has, as shown in Figs. 1, 2, and 5 a cylindrical body 22, bored to fit over the bar 15 so as to rotate freely thereon but is held against end play by fitting between the flanges 14, 14 of the bracket frame. A guard plate 23 is carried on the end of an arm extending from the body 22, it is preferably provided with a pad of suitable soft or flexible material 24 on its forward or striking edge. To provide for universal adjustment of the guard relative to the body 22 of the rotatable member it is formed of two main parts 25 and 26 connected together by a vertical post 27, said post passing through a block 28 adjustably held on the part 25 which extends from the body 22, the other part 26 passes through a head on the upper end of the post 27, the parts are secured in set position after being suitably adjusted. The arm is adjusted with the part 26 arranged to pass between the tools of the press, and when it has passed behind the tools with the guard 23 at the side of the press the trip rod cannot be actuated to start the press. The dotted lines of Fig. 2 indicate the position of the guard set at safety. The working connection between the sliding and rotatable members may be a cam slot 29 formed through the body piece 22 and a roller 30 carried on a stud projecting from the sliding bar 15; the upper part of the slot being inclined, as seen in Fig. 1, so that the first part of the downward movement of the bar 15 will rotate and set the guard in front of the press tools, the roller then being at the bottom of the incline and about to enter a vertical portion of the slot, in traveling down which the guard is held stationary and the upper part of the yoke 19 acts on the head 21 of the trip rod and trips the clutch of the press. It will thus be seen that the guard is positively held in front of the tools as long as the press is free to act, and that the trip rod becomes inactive before the guard is moved away from the front of the press.

In some presses the trip rod is moved upwardly to actuate the clutch instead of downwardly, as in the structure just described. In such case changes in the arrangement of parts are made as illustrated in the fragmentary view Fig. 5, which show the parts in normal inoperative position. The cam slot of the body piece is inverted, the straight vertical portion 31 being at the upper part and the lower part having the inclined portion 32. The relation of the head of the trip rod 20 to the yoke 19 is also reversed, the inaction space being between the under side of the head and the lower branch of the yoke. The treadle or operating means when manipulated to actuate the press raises the sliding bar the first part of the upward movement of which causes the body piece 22 to rotate and so set the guard at safety, and then the yoke 19 strikes and raises the trip rod 20 to release the clutch of the press or allow it to become active.

In the modification shown in Figs. 3 and 4 the sliding member consists of a block 33, preferably a casting, comprising a cylindrical surface in which the cam slot 34 is formed and a yoke portion 35, and is arranged to move between the flanges 14, 14 of the bracket frame, being held in said flanges by a neck 36 at its upper end and a bar 37 at its lower end, which bar is connected to the treadle of the press in manner similar to the bar 15 of the structure previously described. To prevent the sliding member moving in other than a longitudinal direction its rear side is formed to seat against two guideways 38 formed on the supporting plate 13 of the bracket frame. The rotary member is a light frame consisting of flanges 39, fitted to rock on the neck 36 and bar 37 of the sliding member, and a connecting piece 40 which carries the guard plate 25. From the inside of this frame extends a stud on which is a roller 41 working in the cam slot 34. The trip rod 20 passes freely through a bore in the neck 36, the head 21 of the rod being located in the recess or pocket constituting the yoke portion 35 of the sliding member. In operation the device of this modification acts in the same manner as the device shown in Figs. 1 and 2, and it is apparent that it is only a matter of arrangement and adjustment of parts to cause the device of this modification to act like the device shown at Fig. 5.

The safety device of this invention is adapted to be used with the various kinds of presses, the necessary changes therefor being matters of mechanical skill.

It is evident that other modifications, than those here shown, may be made in the construction and arrangement of the various parts of this safety device without departing from the nature of the invention.

I claim:

1. In a press, a safety guard and clutch controlling device comprising a rotatable member carrying the guard, a co-acting sliding member adapted to actuate the trip rod of the clutch and a treadle connected to the sliding member.

2. In a press, a safety guard and clutch controlling device comprising a rotatable member, a sliding member, a working connection between the two members whereby a movement of the sliding member first actuates the rotatable member and then actuates the trip rod of the clutch, a guard carried by the rotatable member and a treadle connected to the sliding member.

3. In a press, a safety guard and clutch controlling device comprising a rotatable member arranged to rock on a vertical axis and carrying the guard, a co-acting vertically sliding member adapted to actuate the trip of the clutch and a treadle connected to the sliding member.

4. In a press, a safety guard and clutch controlling device comprising a rotatable member arranged to rock on a vertical axis, an arm extending from said member carrying on its end a guard plate, a vertically sliding member adapted to actuate the trip rod of the clutch, a working connection between the two members whereby a movement of the sliding member first actuates the rotatable member to set the guard in safety position and then actuates the trip rod of the clutch and press operating means attached to the sliding member.

5. In a press, a safety guard and clutch controlling device comprising a rotatable member arranged to rock on a vertical axis, an arm extending from said member carrying on its end a guard plate, a vertically sliding member, a yoke carried by said sliding member and having a loose connection with the trip rod of the clutch, a working connection between the two members whereby a sliding movement of the sliding member first causes the rotatable member to set the guard plate in safety position and then causes the yoke to move the trip rod and a treadle attached to the sliding member.

6. In a press, a safety device comprising a rotatable member arranged to rock on a vertical axis, an arm extending therefrom consisting of connected parts providing for a vertical adjustment and horizontal adjustments in two directions, a guard plate on the free end of the arm, one of the parts of said arm being adapted to pass between the upper and lower tools of the press, a vertically sliding member, a working connection between the members adapted to rotate the rotatable member when the sliding member is moved and a treadle connected to the sliding member.

7. In a press, a safety device comprising a rotatable member arranged to rock on a vertical axis, an arm extending therefrom consisting of connected parts providing for a vertical adjustment and horizontal adjustments in two directions, a guard plate on the free end of the arm, one of the parts of said arm being adapted to pass between the upper and lower tools of the press, a vertically sliding member, a yoke carried thereby, a clutch trip rod loosely connected to the yoke, a working connection between the two members adapted to first rotate the rotatable member and then actuate the trip rod when the sliding member is moved and a treadle connected to the sliding member.

8. In a press, a safety device comprising a rotatable member arranged to rock on a vertical axis, an arm extending therefrom, a guard plate on the free end of the arm, a vertically sliding member, a yoke carried thereby, a clutch trip rod loosely connected to the yoke, a working connection between the members adapted to rotate the rotatable member and so initially set and hold the guard plate in front of the press tools when the sliding member is moved and an operating treadle connected to the sliding member.

9. A power press, comprising a tool carrying plunger, a clutch trip rod and an operating treadle, in combination with a vertically sliding non-rotatable bar, a bracket frame in which the bar is fitted to slide, a rotatable member held in the bracket frame, a guard carried by the rotatable member adapted to move in front of the press tools, a working connection between the sliding bar and the rotatable member, a connection between the treadle and the sliding bar and a loose connection between the sliding bar and the trip rod.

10. A power press, comprising a tool carrying plunger, a clutch trip rod and an operating treadle, in combination with a vertically sliding non-rotatable bar, a bracket frame in which the bar is fitted to slide, a rotatable member held in the bracket frame and fitted to rock on the sliding bar a guard carried by the rotatable member adapted to move in front of the press tools, a working connection between the sliding bar and the rotatable member, a connection between the treadle and the sliding bar and a connection between the sliding bar and the trip rod.

11. A power press, comprising a tool carrying plunger, a clutch trip rod and an operating treadle, in combination with a vertically sliding non-rotatable bar, a bracket frame in which the bar is fitted to slide, a rotatable member provided with a cam slot and held in the bracket frame, a guard carried by the rotatable member adapted to move in front of the press tools, a roller carried by the sliding bar arranged to work in the cam slot, a connection between the treadle and the sliding bar and a connection between the sliding bar and the trip rod.

12. A power press, comprising a tool carrying plunger, a clutch trip rod and an operating treadle, in combination with a vertically sliding non-rotatable bar, a bracket frame in which the bar is fitted to slide, a rotatable member provided with a cam slot and held in the bracket frame and fitted to rock on the sliding bar, a guard carried by the rotatable member adapted to move in front of the press tools, a roller carried by the sliding bar arranged to work in the cam slot, a connection between the treadle and the sliding bar and a connection between the sliding bar and the trip rod.

13. A power press, comprising a tool carrying plunger, a clutch trip rod and an operating treadle, in combination with a sliding non-rotatable bar, a bracket frame in which the bar is fitted to slide, a rotatable member provided with a cam slot, held in the bracket frame and fitted to rock on the sliding bar, a guard carried by the rotatable member adapted to move in front of the press tools, a roller carried by the sliding bar arranged to work in the cam slot to rock the rotatable member during the initial movement of the sliding bar, a connection between the treadle and the sliding bar, a yoke carried by the sliding bar through which the trip rod passes, and a nut or head on the trip rod acted upon by the yoke to move the trip rod to trip the press clutch during the latter part of the movement of the sliding bar.

14. In a press, a safety guard and clutch controlling device comprising a rotatable member, a sliding member, a guard carried by the rotatable member, a clutch trip rod actuated by the sliding member, a press operating means attached to the sliding member, a cam slot in one of the members and a roller on the other member, whereby a movement of the sliding member first actuates the rotatable member to set the guard in safety position and then actuates the press clutch trip rod.

15. In a press, a safety guard and clutch controlling device comprising a rotatable member carrying the guard, a sliding member whose axis in the direction of movement is coincident with the axis of the rotatable member, a clutch trip rod actuated by the sliding member, a press operating means, a connection between it and the sliding member and a working connection between the members whereby movement of the sliding member rotates the rotatable member to set the guard in safety position and then actuates the press clutch trip rod.

In testimony whereof, I have hereunto subscribed my name this 12th day of March, 1915.

BENJAMIN LEVI.

In the presence of—
WM. J. DOLAN,
JAMES A. HUDSON.